Jan. 23, 1968  V. ZUBLENA  3,364,877
HOUSEHOLD MACHINE FOR MAKING RAVIOLIS
Filed Oct. 22, 1965
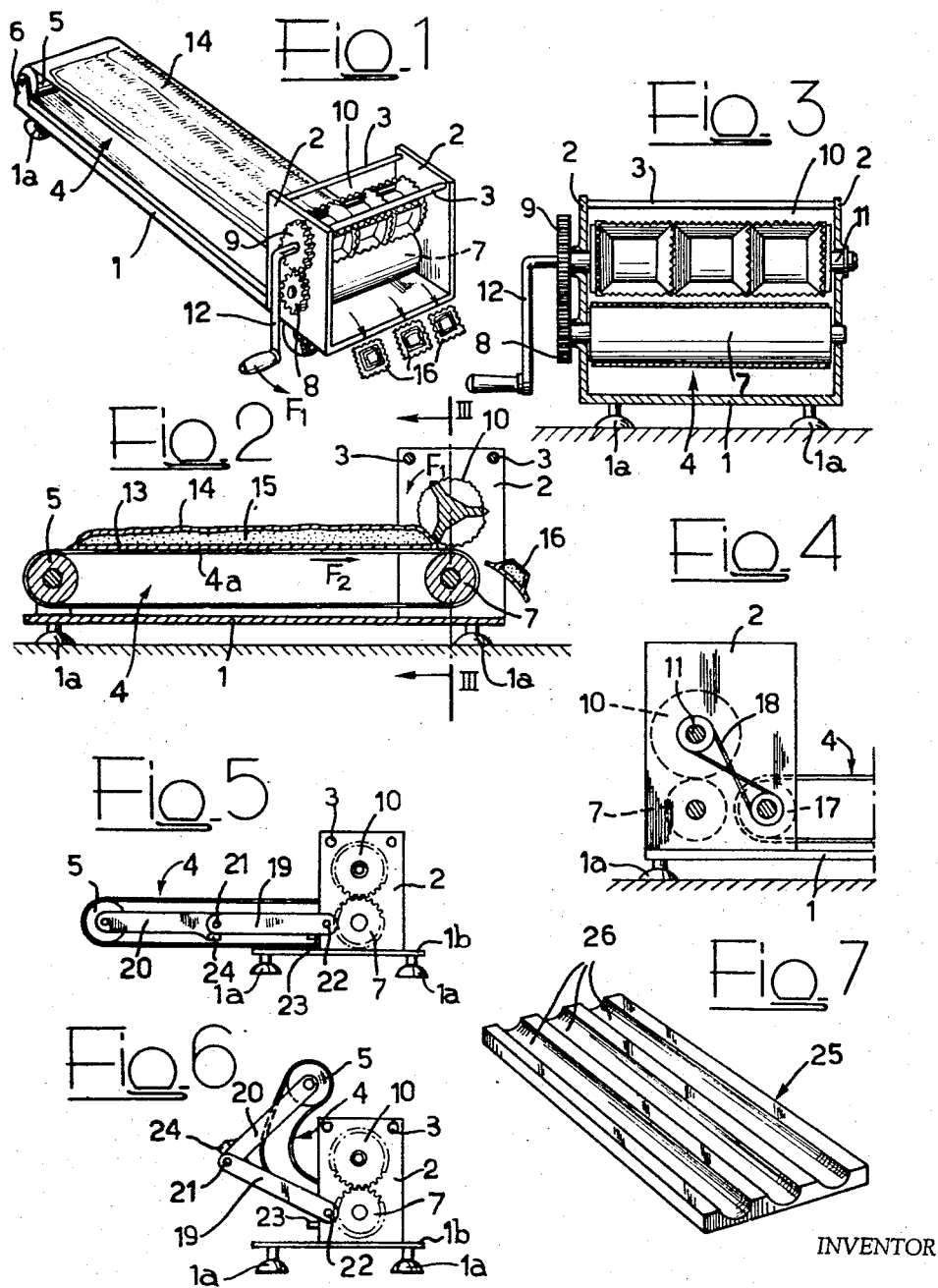
INVENTOR
BY
ATTORNEY

United States Patent Office 3,364,877
Patented Jan. 23, 1968

3,364,877
HOUSEHOLD MACHINE FOR MAKING RAVIOLIS
Vittorio Zublena, 15 Via Guastalla, Turin, Italy
Filed Oct. 22, 1965, Ser. No. 502,197
Claims priority, application Italy, Dec. 14, 1964, 27,395/64
1 Claim. (Cl. 107—1)

ABSTRACT OF THE DISCLOSURE

A machine for making raviolis having a shaping and cutting roller, a backing roller, an endless belt conveyor around the backing roller for feeding the raviolis to the shaping and cutting roller.

---

This invention relates to machines for making raviolis or small patties with a filling, of the type comprising two parallel rollers defining a nip therebetween. One roller is patterned in order to form the raviolis, the other roller is smooth and acts as a backing roller to the shaping roller. Both rollers are operatively connected by transmission means so that upon rotation of one roller, the other roller rotates in an opposite direction.

In known machines of the above mentioned kind the rollers themselves feed the paste in sheet form between which the filling is interposed into the nip, to enable the patterned roller to shape the raviolis and sever them from one another by sharp edged projections thereon.

The feed by the rollers stretches the paste, which adversely affects the regular formation of the raviolis, and may even result in breakage thereof owing to thinning out of the paste. This drawback moreover limits the width of the paste sheet and reduces the capacity of the machine.

In order to obviate the above drawbacks this invention provides a machine for making raviolis of the above referred type, wherein the paste sheets and filling are fed into the nip between the rollers by an endless belt conveyor driven by suitable transmission means by one of the rollers of the machine.

Preferred embodiments of this invention will now be described by way of example with reference to the accompanying drawings wherein:

FIGURE 1 is a perspective view of a machine for making raviolis according to this invention, FIGURE 2 is a longitudinal section thereof, FIGURE 3 is a cross sectional view on line III—III of FIGURE 2, FIGURE 4 is a part side view showing a modification of FIGURE 1, FIGURES 5 and 6 are side views of a further modification of FIGURE 2 and FIGURE 7 is a perspective view of a utensil used for forming the filling.

Referring to the drawings, a supporting frame of the machine comprises a bedplate 1 having secured to an end thereof two sidewalls 2 interconnected by braces 3.

The sidewalls 2 carry a pair of cooperating adjacent rollers 7, 10, of which the roller 7 is a backing roller for the shaping roller 10 formed with patterned recesses adapted to form the raviolis. The machine comprises conveyor means comprising an endless belt 4, the upper branch of which is situated substantially in a plane passing through the nip formed by both rollers.

In the embodiment shown in FIGURES 1 to 3, the conveyor belt 4 is driven by the roller 7. At the tail end of the conveyor the belt passes around a roller 5 freely mounted between two brackets 6 secured to the rear end of the bedplate 1.

The rollers 7, 10 are operatively interconnected by a pair of meshing toothed wheels 8, 9 having equal number of teeth, the roller 10 being rotated by a handle 12 fixed to the roller axle 11. Thus when the handle 12 and roller 10 are rotated in the direction indicated by arrow F1, the backing roller 7, rotates in an opposite direction, and the upper branch 4a of the conveyor belt 4 moves towards the nip between rollers 7, 10, as indicated by arrow F2.

Both paste sheets 13, 14 having the filling 15 interposed therebetween and placed upon the branch 4a of the conveyor belt 4 are fed into the roller nip so as to gradually move the sheet pastes and filling beneath the shaping roller which by virtue of its recesses shapes the raviolis in a known manner and severs them from one another by means of the sharp edged projections thereon.

The severed raviolis formed by the two rollers are denoted by 16.

The shaping roller may be provided with recesses adapted to form raviolis or similar patties, such as known in Italy by the names of cappelletti, tortellini and the like.

FIGURE 4 shows a modified embodiment in which the conveyor belt 4 is driven by a separate driving roller 17 arranged beside the backing roller 7, which in this case is mounted for idle rotation. The driving roller 17 for the conveyor belt 4 is operatively connected to the shaping roller 10 by means of a suitable transmission, such as a crossed belt 18.

FIGURES 5 and 6 show a further modification in which the tail roller 5 of the conveyor is supported by a foldable frame comprising two pairs of arms 19, 20 hingedly connected at 21. The free ends of arms 19 are articulated at 22 to respective sidewalls 2 and the roller 5 is rotatably supported by the free ends of the arms 20. The shaping and backing rollers are supported by a rigid frame comprising a bed-plate 1b and two sidewalls 2 interconnected by braces 3.

Each sidewall 2 is provided with a stop member 23 adapted to limit rotation of the arms 19; similarly, each arm 20 is provided with a stop member 24 by which the frame formed by the arms 19, 20 can be held in its stretched operating position. By folding the frame the roller 5 is drawn near the sidewalls 2 to reduce the space required for storing the machine.

The machine comprises known means (not shown) for adjusting tension of the conveyor belt 4.

The bedplate 1, or 1b rests on suction cups 1a adhering to the table on which the machine is used.

FIGURE 7 shows a utensil adapted to facilitate distribution of the filling 15 on the paste sheet 13. The utensil comprises a board 25 formed on one face with parallel grooves 26 receiving the filling. By sharply upturning the board 25 on the sheet 13, the filling is deposited on the sheet in the form of parallel strips so as to facilitate forming of the raviolis.

In the above described machine feed is due to the movement of the conveyor belt 4, which gradually brings the sheets and filling beneath the shaping roller 10 at a speed which suits the peripheral speed of said roller. Consequently, the paste is not pulled by the rollers, the function of which is merely to form and sever the raviolis.

What I claim is:

1. A household machine for making raviolis comprising:
    (a) a rigid frame;
    (b) a shaping roller and a backing roller rotatably mounted on said frame, and defining a nip;
    (c) a first arm having an extended position and hingedly connected at one end to said frame for rotational movement away from its extended position;
    (d) a second arm having an extended position and hingedly connected at one end to the other end of said first arm for rotational movement away from its extended position;
(e) stop means preventing rotation of said first and second arms in one direction past their respective extend positions;
(f) a tail roller rotatably mounted on the other end of said second arm;
(g) an endless belt conveyor supported by said tail roller and presenting a branch situated substantially in a plane passing through said nip;
(h) driving means for said conveyor; and
(i) transmission means operatively connecting one of said rollers with said driving means.

References Cited

UNITED STATES PATENTS

| | | | |
|---|---|---|---|
| 2,277 | 9/1841 | Darling | 107—69 |
| 492,206 | 2/1893 | Hunter et al. | 107—68 |
| 1,732,567 | 10/1929 | Pereyra | 107—69 |
| 1,882,160 | 10/1932 | Paris | 107—69 |
| 2,437,202 | 3/1948 | Marino | 107—69 |

WALTER A. SCHEEL, *Primary Examiner.*

A. O. HENDERSON, *Assistant Examiner.*